United States Patent [19]

Archibald et al.

[11] 3,917,618

[45] Nov. 4, 1975

[54] ε-(1-PIPERIDINO)THIOCARPROAMIDES

[75] Inventors: John Leheup Archibald, Windsor; Adrian Charles Ward Curran, Reading, both of England

[73] Assignee: John Wyeth & Brother Limited, Maidenhead, England

[22] Filed: June 20, 1973

[21] Appl. No.: 371,648

[30] Foreign Application Priority Data

June 30, 1972 United Kingdom............... 30637/72

[52] U.S. Cl.. 260/293.85; 260/293.86; 260/293.88; 424/267

[51] Int. Cl.² ..................................... C07D 295/10

[58] Field of Search................... 260/293.85, 293.86

[56] References Cited
OTHER PUBLICATIONS

Lightowler et al., Arch. int. Pharmacodyn, 145, (1–2), 233–242, (1963).

Primary Examiner—G. Thomas Todd

[57] ABSTRACT

This invention provides novel ε-(1-piperidino)caproamides and thioamides which are useful as anti-ulcer agents.

5 Claims, No Drawings

ε-(1-PIPERIDINO)THIOCARPROAMIDES

This invention relates to piperidine derivatives which have pharmacological activity, for example anti-ulcer activity.

According to the invention there is provided a compound selected from the group consisting of compounds of formula:

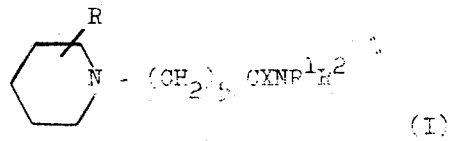
(I)

wherein R is selected from the group consisting of hydrogen and methyl; $R^1$ and $R^2$ are the same, or different, and are selected from the group consisting of hydrogen and alkyl of 1 to 6 carbon atoms; and X is selected from the group consisting of oxygen and sulphur; and the pharmaceutically acceptable acid addition salts, thereof.

Preferred alkyl groups for $R_1$ and $R^2$ are methyl, ethyl, n-propyl, iso-propyl and n-, s- and t-butyl.

The acid addition salts include salts such as the hydrochloride, hydrobromide, sulphate, phosphate, nitrate, maleate, tartrate, succinate, fumarate and oxalate salts.

A first general method for preparing the compound of formula (I) comprises condensing a piperidine of formula:

(II)

wherein R is as defined above with a haloalkylene compound of general formula $$Hal - (CH_2)_5 - CXNR^1R^2$$
(III)

wherein, Hal denotes a halogen atom e.g. chlorine or bromine, and X, $R^1$ and $R^2$ are as defined above. The reaction is conveniently conducted in the presence of an excess of the piperidine (II). Alternatively another acid acceptor may be used.

A second method for preparing compounds of general formula (I), wherein X is oxygen, comprises treating a corresponding acid halide, ester or mixed anhydride of general formula:

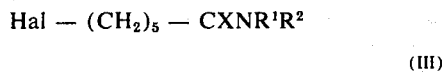
(IV)

wherein Z represents halogen, or an alcohol or anhydride residue and R is as defined above, with ammonia or an amine of general formula $HNR^1R^2$ wherein $R^1$ and $R^2$ are as defined above.

The starting materials may be prepared by standard methods. For instance the mixed anhydrides are preferably those formed by reaction of an alkyl haloformate, e.g. ethyl chloroformate, with the appropriate acid of general formula (IV) wherein Z is OH, in the presence of a tertiary base in an inert solvent such as a halogenated hydrocarbon. When an ester of general formula (IV) is used e.g. one in which Z represents $OR^3$- where $R^3$ is lower alkyl, e.g. of 1 to 6 carbon atoms, the reaction is preferably conducted in a lower alkanol, e.g. methanol, as solvent.

Acid halides of general formula (IV) may be prepared by standard methods, e.g. treatment of the corresponding acid with phosphorus pentachloride, phosphorous trichloride or thionyl chloride.

A third method for preparing compounds of general formula (I), wherein X is oxygen and $R^1$ and $R^2$ are hydrogen atoms comprises partially hydrolysing a corresponding nitrile of general formula:

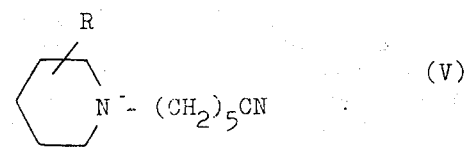
(V)

wherein R is as defined above, e.g. with mineral acids, e.g. 96% sulphuric acid, or hydrogen peroxide.

Compounds of general formuls (I) wherein X is oxygen, $R^1$ is hydrogen and $R^2$ is t-butyl can be obtained by conducting this reaction in the presence of t-butanol.

A further method for preparing compounds of general formula (I), wherein X is sulphur comprises reacting a nitrile of general formula (V) with hydrogen sulphide to give a compound of general formula (I) wherein X is sulphur and $R^1$ and $R^2$ are hydrogen. N-monosubstituted thioamides of general formula (I) can be prepared by conducting the above reaction in the presence of a primary amine $R^1NH_2$ wherein $R^1$ is alkyl or aralkyl as defined above.

Another method for preparing thioamides of general formula (I), wherein X is sulphur and $R^1$ and $R^2$ represent hydrogen atoms comprises reacting a nitrile of general formula (V) with a thioamide of general formula $R^4CSNH_2$ wherein $R^4$ is an alkyl group, e.g. a lower alkyl group of 1-6 carbon atoms, preferably a methyl group, in a solvent such as dimethylformamide saturated with hydrogen chloride.

Alternatively thioamides of general formula (I) wherein X is sulphur can be prepared by treating the corresponding amide of general formula (I) with phosphorus pentasulphide. The reaction can be carried out in a suitable inert solvent such as a high boiling hydrocarbon, e.g. xylne.

Yet another process for preparing thioamides of general formula (I) comprises reacting an alkyl thioacetate of formula:

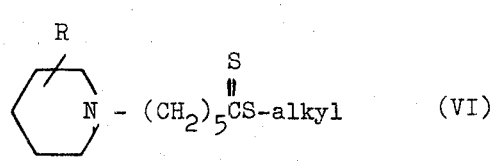
(VI)

wherein R is as defined above with a compound of general formula $R^1NH_2$ wherein $R^1$ is as defined in connection with formula I. The reaction may be carried out in a suitable solvent e.g. a lower alkanol.

A compound of general formula (I) wherein $R^1$ and/or $R^2$ represent alkyl or aralkyl may be prepared by alkylation of the corresponding compound of general formula (I) wherein $R^1$ and/or $R^2$ represent hydrogen atoms.

The compounds of general formula (I) have pharmaceutical activity, e.g. anti-ulcer activity. The anti-ulcer activity of compounds of the invention was determined by the method of Brodie and Hanson, J. App. Physiol., 15,291, (1960). In this test $\epsilon$-(1-piperidino)caproamide had particularly good activity. The test procedure was:

Male rats, weighing between 80 and 120 gms., were fasted overnight with water ad lib. The rats were then divided into groups of six and dosed orally with the test drug, or with the vehicle alone, 0.5% carboxymethylcellulose, in a volume of 10 ml/kg. After 30 minutes the rats were inserted into aluminum restraining tubes measuring 1 5/8 inches in diameter by 5 inches and placed in the cold (4±1°C) for 3 hours. Immediately after cold exposure rats were killed by intra-cranial alcohol injection and their stomachs excised and opened along the greater curvature. Each stomach was gently rinsed free of contents with warm tap water and pinned out on a board. The condition of the gastric mucosa was then scored from 0 to 6 on the following scale:

| Ulcers | | | |
|---|---|---|---|
| | 0 | = | No ulcers |
| 0 to 6 | 1 | = | Pin-point haemorrhagic site |
| | 2, 3, 4 | = | Several discrete pin-point haemorrhagic sites |
| | 5, 6 | = | Large eroded sites with haemorrhage |

The maximum possible score for each animal was 6 and for the group 36. In the control group of animals dosed with vehicle alone, the observed score was between 21 and 26. Decrese in ulcer formation was calculated as a percentage of the control score, i.e.

$$\text{Percentage inhibition} = \frac{\text{Total control group score} - \text{Total test group score}}{\text{Total control group score}} \times 100$$

The statistical significance of the effect was assessed by Student's t-test.

In the above test $\epsilon$-(1-piperidino)caproamide was found to give between 50 and 77% inhibition in the dose range 100–10 mg/kg. indicating particularly good activity, $\epsilon$-(1-piperidino)thiocaproamide was found to give 80% inhibition at 100 mg/kg. dose level, indicating very good activity at this dose.

The invention includes a pharmaceutical composition comprising a compound of general formula (I), or salt thereof, as defined above, and a pharmaceutical carrier.

Any suitable carrier known in the art can be used to prepare the pharmaceutical compositions. In such a composition the carrier may be a solid, liquid or mixture of a solid and a liquid. Solid form compositions include powders, tablets and capsules. A solid carrier can be one or more substances which may also act as flavouring agents, lubricants, solubilisers, suspending agents, binders, or tablet disintegrating agents; it can also be an encapsulating material. In powders the carrier is a finely divided solid which is in admixture with the finely divided active ingredient. In tablets the active ingredient is mixed with a carrier having the necessary binding properties in suitable proportions and compacted in the shape and size desired. The powders and tablets preferably contain from 5 to 99, preferably 10–80% of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax, and cocoa butter. The term "compositions" is intended to include the formulations of an active ingredient with encapsulating material as carrier to give a capsule in which the active ingredient (with or without other carriers) is surrounded by carrier, which is thus in association with it. Similarly cachets are included.

Sterile liquid form compositions include sterile solutions, suspensions, emulsions, syrups and elixirs. The active ingredient can be dissolved or suspended in a pharmaceutically acceptable sterile liquid carrier, such as sterile water, sterile organic solvent or a mixture of both. Where the active ingredient is sufficiently soluble it can be dissolved in normal saline as a carrier; if it is too insoluble for this it can often be dissolved in a suitable organic solvent, for instance aqueous propylene glycol or polyethylene glycol solutions. Aqueous propylene glycol containing from 10 to 75% of the glycol by weight is generally suitable. In other instances compositions can be made by dispersing the finely-divided active ingredient in aqueous starch or sodium carboxymethyl cellulose solution, or in a suitable oil, for instance arachis oil.

Preferably the pharmaceutical composition is in unit dosage form. In such form, the composition is subdivided in unit doses containing appropriate quantities of the active ingredient; the unit dosage form can be a packaged composition, the package containing specific quantities of compositions, for example packeted powders or vials or ampoules. The unit dosage form can be a capsule, cachet or tablet itself, or it can be the appropriate number of any of these in packaged form. The quantity of active ingredient in a unit dose of composition may be varied or adjusted from 5 mg. or less to 500 or more, according to the particular need and the activity of the active ingredient. The invention also includes the compounds in the absence of carrier where the compounds are in unit dosage form.

When used as anti-ulcer agents the compositions of the invention will be administered orally in either liquid or solid composition form. The anti-ulcer compositions may include one or more antacid ingredients e.g. aluminium hydroxide, magnesium hydroxide or bismuth carbonate.

The invention also includes a method of treating ulcers in an affected host which comprises administering to said host a compound of general formula (I), or salt thereof, as defined above.

The following examples illustrate the invention:

EXAMPLE 1

A. Methyl-$\epsilon$-(1-piperidino)caproate $\epsilon$-Bromocaproic acid was prepared by treating neat caprolactone with hydrogen bromide gas according to the method of Brown & Partridge (J.A.C.S. 1944, 66, 839) and isolated as colourless needles m.p. 35° in 70% yield. The acid was esterified according to the method of the same authors giving methyl-ε-bromocaproate as a colourless oil b.p. 150°/50 mm. (80% yield). The title compound was prepared by treating methyl-ε-bromocaproate with piperidine according to the method of Lu & Magidson (C.A. 54, 17405e) and isolated as a colourless oil b.p. 90°/0.01 mm. in 75% yield.

B. ε-(1-Piperidino)caproamide

Methyl-ε-piperidino caproate (5.8 gm., 0.027 m.) was dissolved in methanolic ammonia (100 ml.) and heated at 50° in a sealed tube for 18 hours. The volatile material was removed in vacuo and the residual solid recrystallised from benzene giving the title compound as colourless needles m.p. 99°C (3 gm., 58%)
Found: C, 66.38; H, 11.26; N, 14.09%; $C_{11}H_{22}N_2O$.
Requires: C, 66.62; H, 11.19; N, 14.13%.

EXAMPLE 2

A. ε-(1-Piperidino)capronitrile

ε-Bromocapronitrile was prepared from 1,5-dibromopentane using potassium cyanide in aqueous ethanol according to the method described in Org. Syn. Vol. 1 pp.156 and was isolated as a colourless oil b.p. 120°/15 m.m. in 60% yield.

ε-Bromocapronitrile (20 gm., 0.115 m.) was added dropwise to a warm solution of piperidine (22.8 gm., 0.26 m.) in benzene (50 ml.) and chloroform (10 ml.) and the mixture heated at reflux for 5 hours. The piperidine hydrobromide was filtered and the filtrate evaporated. The residual oil was distilled to give the title compound as a colourless oil b.p. 85°/0.02 mm. (18.7 gm., 93%).

B. ε-(1-Piperidino)thiocaproamide hydrochloride

ε-Piperidinocapronitrile (8 gm.) was dissolved in triethylamine (4.55 gm.) and pyridine (20 ml.) and the mixture treated with $H_2S$ for 24 hours then heated in a sealed tube at 50°C for 12 hours. The volatile material was removed in vacuo. The residual oil (6 gm.) was converted to the hydrochloride by passing dry HCl gas into an ethereal solution (100 ml.). The resultant solid was recrystallised from ethanol-ether to give the title compound as colourless needles (2.5 gm.) m.p. 181.5°.
Found C, 53.23; H, 9.38; N, 11.06%; $C_{11}H_{23}N_2SCl$.
Requires: C, 52.67; H, 9.24; N, 11.17%.

EXAMPLE 3

ε-(2-Methylpiperidino)caproamide

Following the procedure of Example 1A methyl-ε-bromocaproate is treated with 2-methyl-piperidine to afford methyl ε-(2-methyl-piperidino)caproate which is converted to the title compound by treatment with methanolic ammonia in the manner described in Example 1B.

EXAMPLE 4

ε-(3-Methylpiperidino)caproamide

Following the procedure of Example 1A methyl ε-bromocaproate is treated with 3-methyl-piperidine to afford methyl ε-(3-methylpiperidino)caproate which is converted to the title compound by treatment with methanolic ammonia in the manner described in Example 1B.

EXAMPLE 5

ε-(4-Methylpiperidino)caproamide

Following the procedure of Example 1A methyl ε-bromocaproate is treated with 4-methylpiperidine to afford methyl ε-(4-methyl-piperidino)caproate which is converted to the title compound by treatment with methanolic ammonia in the manner described in Example 1B.

EXAMPLE 6

ε-(2-Methylpiperidino)thiocaproamide

Following the general procedure of Example 2A, ε-bromocapronitrile is reacted with 2-methylpiperidine to give ε-(2-methylpiperidino)capronitrile which is treated with $H_2S$ following the procedure described in Example 2B to afford ε-(2-methylpiperidino)thiocaproamide as the hydrochloride.

EXAMPLE 7

ε-(3-Methylpiperidino)thiocaproamide

Following the general procedures of Example 2A. ε-bromocapronitrile is reacted with 3-methylpiperidine to yield ε-(3-methylpiperidino)capronitrile which is treated with $H_2S$ according to the procedure described in Example 2B to afford ε-(3-methylpiperidino)thiocaproamide as the hydrochloride.

EXAMPLE 8

ε-(4-Methylpiperidino)thiocaproamide

Following the general procedure of Example 2A, ε-bromocapronitrile is reacted with 4-methylpiperidine to yield ε-(4-methylpiperidino)capronitrile which is treated with $H_2S$ according to the procedure described in Example 2B to afford ε-(4-methylpiperidino)thiocaproamide as the hydrochloride.

EXAMPLE 9

6-(1-Piperidino)-N-isopropylcaproamide

ω-Bromocaproyl chloride (10 gm., 0.047 m.) was dissolved in benzene (10 ml.) and added to a solution of isopropylamine (2.8 gm., 0.047 m.) and triethylamine (4.8 gm., 0.047 m.) in dry benzene (25 ml.). After 30 minutes ether (50 ml.) was added and the triethylamine hydrochloride filtered and the filtrate evaporated in vacuo. The residual solid was recrystallised from petroleum ether (40°-60°) to give ω-bromo-N-isopropylcaproamide (7.5 gm.) which was added to a solution of piperidine (2.4 gm.) and triethylamine (2.8 gm.) in benzene and the mixture heated under reflux for 24 hrs. The hydrochloride of the title compound precipitated on cooling and was filtered and reconverted to the free base (3.6 gm.). All salts prepared (hydrochloride, hydrobromide, oxalate and tartrate) proved to be deliquescent.

EXAMPLE 10

| Chewable Antacid Tablet | mg. |
| --- | --- |
| Saccharin | 1.0 |
| Hydrated alumina sucrose powder | 750.0 |
| ε-(1-piperidino)caproamide | 100.0 |
| Mannitol B.P. | 170.0 |
| Maize starch B.P. dried | 30.0 |
| Talc, purified B.P. | 28.0 |
| Magnesium stearate B.P. | 20.0 |
| Peppermint oil B.P. | 1.0 |
|  | 1080.0 |

Antacid tablets of the above formulation are prepared by the following procedure: peppermint oil is triturated with talc (screen 40 mesh). The tritrate and other ingredients are mixed thoroughly in a blender. The powder is slugged to hard slugs which are then granulated through a 14 mesh screen and compressed on a standard tabletting machine to give tablets of the required size.

EXAMPLE II

| Anti-ulcer tablet (without antacid) | mg. |
|---|---|
| ε-(1-piperidino)caproamide | 100 |
| Celutab | 147.5 |
| Magnesium stearate | 2.5 |
| | 250.0 |

Celutab is a commercial product containing 90–92% dextrose, 3–5% maltose and higher glucose saccharidesspray crystallised.

Tablets of the above formulation are prepared by blending the ingredients in a suitable blender and compressing the blended ingredients on a standard tabletting machine to form tablets of the above composition.

What is claimed is:

1. A compound selected from the group consisting of bases having the formula

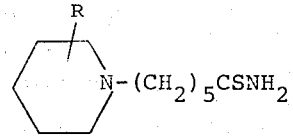

wherein R is a member of the group consisting of hydrogen and methyl and the acid addition salts of said bases with pharmaceutically acceptable acids.

2. A compound as claimed in claim 1 which is ε-(1-piperidino)thiocaproamide.

3. A compound as claimed in claim 1 which is ε-(2-methylpiperidino thiocaproamide.

4. A compound as claimed in claim 1 which is ε-(3-methylpiperidino) thiocaproamide.

5. A compound as claimed in claim 1 which is ε-(4-methylpiperidino) thiocaproamide.

* * * * *